US008904869B2

(12) United States Patent
Paturle

(10) Patent No.: US 8,904,869 B2
(45) Date of Patent: Dec. 9, 2014

(54) ALARM METHOD FOR INDICATING THE WEAR OF A TYRE WITH A GROOVE

(75) Inventor: Antoine Paturle, Pont du Chateau (FR)

(73) Assignees: Compagnie Generale des Establissements Michelin, Clermont-Ferrand (FR); Michelin Recherche et Technique S.A., Granges-Paccot (CH)

( * ) Notice: Subject to any disclaimer, the term of this patent is extended or adjusted under 35 U.S.C. 154(b) by 322 days.

(21) Appl. No.: 13/140,482

(22) PCT Filed: Dec. 21, 2009

(86) PCT No.: PCT/FR2009/052640
§ 371 (c)(1),
(2), (4) Date: Jul. 7, 2011

(87) PCT Pub. No.: WO2010/072962
PCT Pub. Date: Jul. 1, 2010

(65) Prior Publication Data
US 2011/0252862 A1    Oct. 20, 2011

(30) Foreign Application Priority Data
Dec. 23, 2008    (FR) ..................................... 08 59020

(51) Int. Cl.
*G01M 17/02*    (2006.01)

(52) U.S. Cl.
CPC ..................................... *B06C 11/24* (2013.01)
USPC .................. 73/584; 73/146; 73/579; 73/646; 701/29.1

(58) Field of Classification Search
USPC ............... 73/7, 146, 570, 584, 587, 645–650; 701/29.1
See application file for complete search history.

(56) References Cited

U.S. PATENT DOCUMENTS

| 2004/0064219 | A1* | 4/2004 | Mancosu et al. ................... 701/1 |
| 2006/0266120 | A1* | 11/2006 | Riegel et al. .................... 73/587 |
| 2008/0257047 | A1* | 10/2008 | Pelecanos et al. ............... 73/587 |
| 2009/0210111 | A1 | 8/2009 | Laermer et al. .................. 701/30 |
| 2010/0199756 | A1 | 8/2010 | Hanatsuka ....................... 73/146 |
| 2012/0167687 | A1* | 7/2012 | Wakao ............................ 73/579 |

FOREIGN PATENT DOCUMENTS

| DE | 10 2004 016 488 A1 | 10/2005 |
| DE | 10 2006 028 411 A1 | 12/2007 |
| EP | 1 542 035 A1 | 6/2005 |
| WO | WO 2009/008319 A1 | 1/2009 |

OTHER PUBLICATIONS

English Translation of DE 102004016488.*
English Translation of DE 102006028411.*

* cited by examiner

*Primary Examiner* — John Fitzgerald
*Assistant Examiner* — Alexander Mercado
(74) *Attorney, Agent, or Firm* — Fitzpatrick, Cella, Harper & Scinto

(57) ABSTRACT

In a method for alerting to the wear of a tire that includes a tread strip equipped with at least one circumferential groove,
  the running noise made by the tire running along a ground is measured,
  from the measured running noise, a noise emitted in a predetermined range of frequencies close to a predetermined resonant frequency of a portion of the circumferential groove during running is isolated,
  the amplitude of the isolated noise is measured, and
  the measured amplitude is compared against a predetermined alert threshold.

8 Claims, 4 Drawing Sheets

ALARM METHOD FOR INDICATING THE WEAR OF A TYRE WITH A GROOVE

Figure 1:
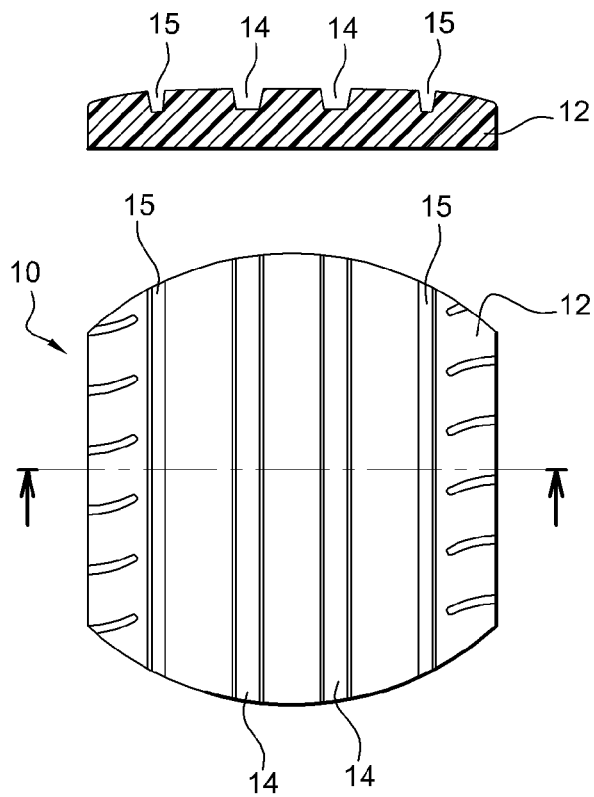

The invention relates to the field of motor vehicle tyres and how their wear is detected.

As a tyre runs over ground, its tread strip, which is in contact with the ground, becomes worn through friction.

For obvious safety reasons it is important to replace a tyre before the wear of its tread strip becomes too great and carries the risk of significantly reducing grip on a wet road surface, particularly where the standing water is deep (where there is a risk of hydroplaning).

To make it easier to check the wear and to detect excessively pronounced wear, tyres are commonly equipped with tread wear indicators.

One example of a tread wear indicator commonly used is a rib created in the bottom of a groove of the tread pattern of the tyre and the height of which corresponds to the minimum depth of tyre groove needed for the tyre to operate correctly and reliably. Thus, when the tyre tread strip has become worn and the top of the rib comes flush with the exterior surface of the tread strip, that means that the minimum depth tolerated for the groove depth has been reached, or even passed. It is therefore urgent for the tyre to be replaced for safety reasons.

One disadvantage with this type of tread wear indicator is that it requires vigilance on the part of the driver of the motor vehicle and a regular visual inspection of the condition of his tyres. Now, many drivers omit to perform such checks and change their tyres too late, for example when, during compulsory vehicle testing at a garage, the state of wear of the tyres is checked.

It is a notable object of the invention to provide a method of alerting to the wear of a tyre that is simple, reliable and inexpensive.

To this end, the subject of the invention is a method for alerting to the wear of a tyre comprising a tread strip equipped with at least one circumferential groove, in which:
  the running noise made by the tyre running along a ground is measured,
  from the measured running noise, a noise emitted in a predetermined range of frequencies close to a predetermined resonant frequency of a portion of the groove during running is isolated,
  the amplitude of the isolated noise is measured,
  the measured amplitude is compared against a predetermined alert threshold.

The method of the invention proposes using the properties of resonance of circumferential grooves formed at the surface of the tread strip of a tyre.

That part of the tyre that is in contact with the ground is known as the contact patch. The portion of the circumferential groove contained in the contact patch is covered by the ground. Thus covered, this portion forms a pipe which goes into resonance as a result of the vibrations induced by the running of the tyre over the ground.

The resonance of this portion causes a specific noise characterized by a frequency range centred on a resonant frequency that is dependent on the length of the portion (this being a characteristic that is practically independent of the running speed) but the amplitude of which changes according to the cross section of the pipe which itself changes according to the wear of the tyre.

The method of the invention therefore makes it possible, by measuring the amplitude of the sound produced by the resonance of the groove, to determine the wear of the tyre, and to do so irrespective of the type of tyre used. This method is therefore particularly advantageous because it can be implemented without any need to design a special tyre. Another advantage of the method of the invention is that detection is independent of the running speed, making the noise processing algorithm easier and reducing the cost of implementing it.

An alerting method according to the invention may further comprise one or more of the following features:
  the predetermined resonant frequency is that of a portion of the groove of a length substantially equal to the length of the contact patch via which the tyre is in contact with the ground. Specifically, as mentioned hereinabove, the groove forms a pipe which goes into resonance when covered by the ground. Now, the groove is covered by the ground all along the contact patch. Therefore, when the groove is covered by the ground, it forms a pipe the length of which is substantially equal to the length of the contact patch in which the tyre is in contact with the ground. Its resonant frequency is therefore substantially equal to that of a pipe with a cross section equal to the cross section of the groove and a length equal to the length of the contact patch.
  the predetermined frequency is substantially equal to C/2L, where C is the speed at which sound travels through the air and L is the length of the contact patch. Specifically, it is known that the first fundamental mode of vibration of a pipe open at both ends is such that the wavelength $\lambda$ of the vibration is equal to twice the length of the pipe, that is to say to 2L. Now, the frequency is equal to the speed at which sound travels through the air divided by the wavelength, namely to C/2L.
  the predetermined alert threshold is dependent on a mean value of the running noise of the tyre running along the ground. Specifically, the higher the speed at which the tyre is running, the greater the parasitic noises due to the friction of the contact patch against the ground and the higher the mean value of running noise. It is advantageous for these parasitic noises to be taken into consideration when determining the value of the alert threshold, thus avoiding triggering an alert as a result of parasitic noise.
  with the tyre in the new condition comprising a circumferential groove, a tyre wear alert is triggered when the measured amplitude of resonance of the groove is below the predetermined alert threshold. In this embodiment of the invention, as the tyre gradually becomes worn, the cross section of the groove decreases, and this leads to a reduction in the acoustic amplitude of resonance of the groove. Specifically, the acoustic amplitude of resonance of the groove is directly proportional to the cross section of the pipe formed by the combination of the groove with the ground. Hence, when the tyre is new, the circumferential groove causes a noise at high amplitude. When the amplitude of this noise drops below the predetermined alert threshold it can be considered that the cross section of the groove is small and that this is due to pronounced tyre wear. A tyre wear alert can therefore be triggered.
  with the tyre in the new condition comprising a circumferential channel embedded in the tread strip, the said channel forming a circumferential groove when the tyre becomes worn, a tyre wear alert is triggered when the measured amplitude of resonance of the groove is above the predetermined threshold. In this other embodiment, the circumferential groove does not appear until the tyre has become worn. When the tyre is new, this groove has the form of a channel embedded within the tread strip, that is to say not open to the external surface of the tread strip. Thus, when the tyre is new, no groove resonance noise appears. By contrast, when the tyre is sufficiently worn that the circumferential channel opens onto the tread strip and forms a circumferential groove, this groove goes into resonance, causing a resonance noise to occur. Thus, when the measured amplitude of resonance of the groove is above a predetermined threshold, that means that tyre wear is such that a groove has appeared at its surface and it is therefore time to trigger a tyre wear alert.

the channel has a cross section of at least 25 mm².

at least two spikes of different frequencies corresponding to the resonance noises of two circumferential grooves that are axially offset from the median plane of the tyre are isolated from the running noise in the predetermined range, then the relative amplitudes of the two spikes are compared. As a tyre runs along, its flattening gives rise to a contact patch that is ovalized, that is to say that is longer in the middle than at the "shoulders". As a result, the length of the respective pipes formed by axially offset grooves differs as too do the resonant frequencies. The formula F=C/2L can be used to deduce the relative variation in frequency with respect to the length of the pipe:

$$\frac{\Delta F}{F} = -\frac{\Delta L}{L},$$

and so an additional 1% of pipe length results in a resonant frequency that is 1% lower. Two distinct resonance spikes are found in the predetermined range. As already indicated, the amplitude of these spikes is dependent on the cross section of the grooves. Thus, in the case of a tyre which, in the new condition, comprises two grooves of different lengths in the contact patch, it is possible to detect abnormal or uneven tyre wear if the amplitudes of resonance of the two spikes are not functions of the ratio of their initial cross sections. Of course, a tyre equipped with more than two grooves could be used.

Figure 2:
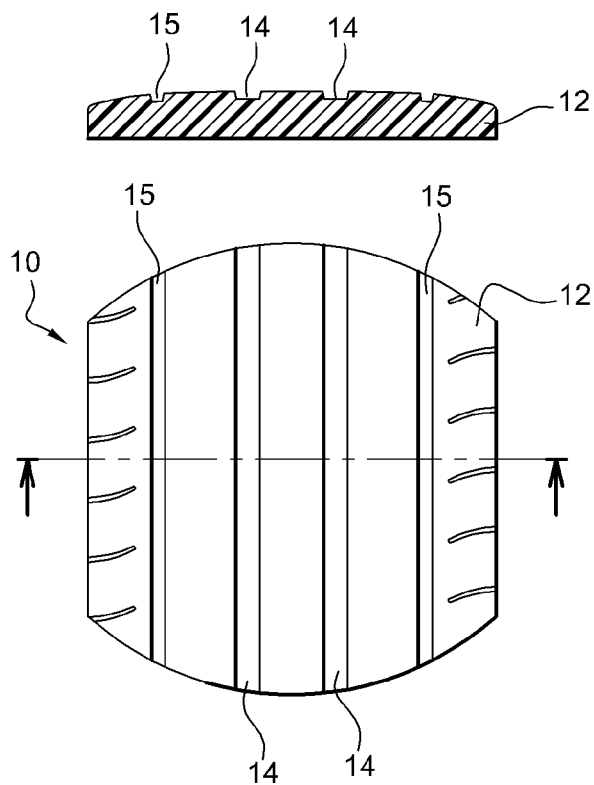
Figure 3:
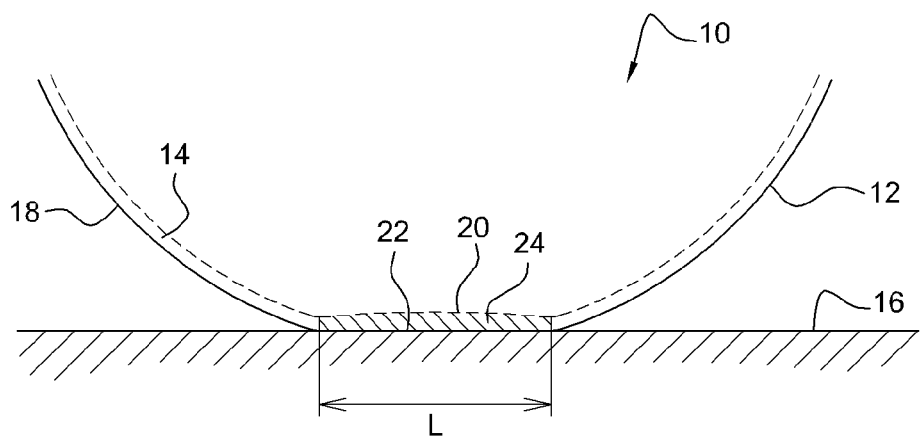
Figure 4:
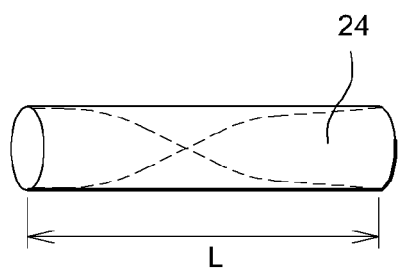
Figure 5:
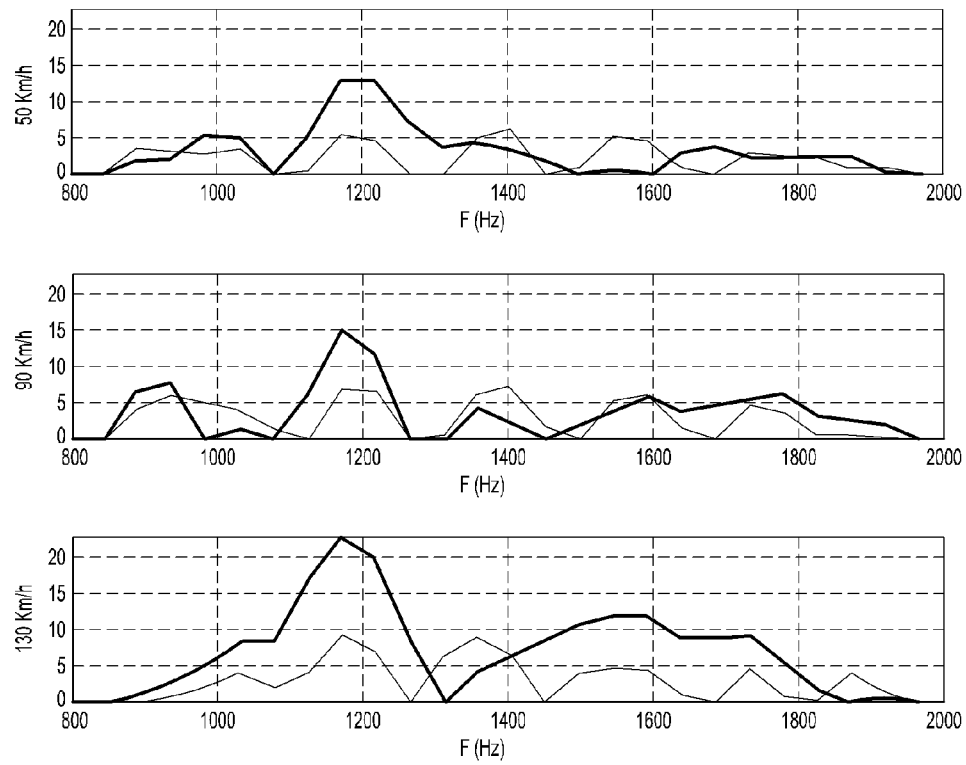
Figure 6:
Figure 7:
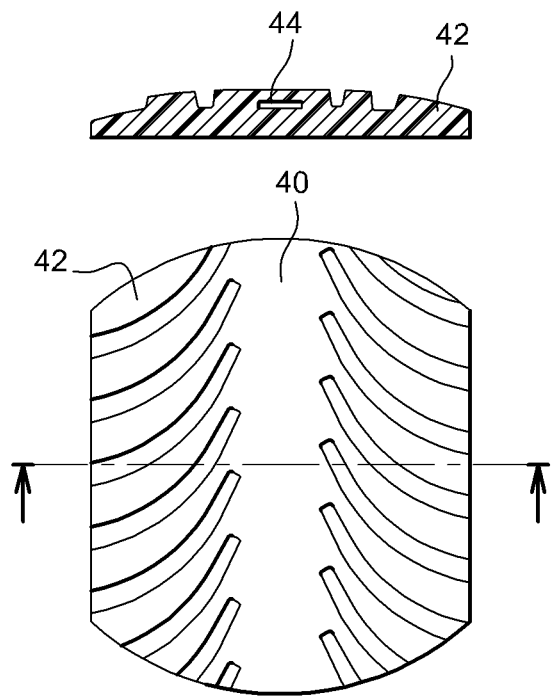
Figure 8:
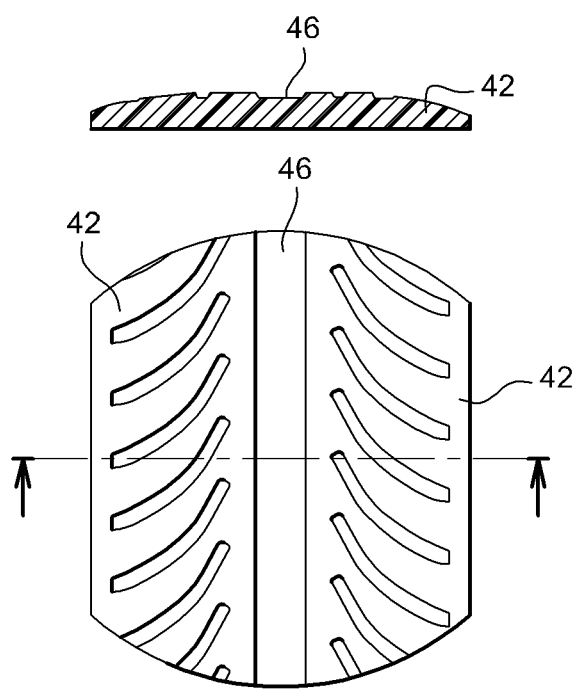

The invention will be better understood from reading the following description, given solely by way of example with reference to the attached figures in which:

FIG. 1 schematically depicts the tread strip of a tyre according to a first embodiment, in the new condition, in axial section and the contact patch via which this tread strip is in contact with the ground, FIG. 2 depicts the tread strip of FIG. 1, in a worn condition, FIG. 3, in radial section, depicts the tyre of FIGS. 1 and 2 running along the ground, FIG. 4 schematically depicts the pipe formed by the groove of the tyre as it runs along the ground, FIG. 5 comprises three graphs representing, in terms of frequency, the running noise of the tyre of FIGS. 1 and 2, in the new condition and in the worn condition, at three different running speeds, FIG. 6 comprises a graph representing the running noise of a tyre comprising two circumferential grooves which are axially offset relative to the median plane of the tyre as depicted in FIG. 1, FIG. 7 schematically depicts the tread strip of a tyre according to a second embodiment, in the new condition, in axial section and the contact patch via which this tread is in contact with the ground, FIG. 8 depicts the tread strip of the tyre of FIG. 4, in the worn condition.

FIG. 1 depicts a tyre denoted by the overall reference 10, according to a first embodiment, the tyre 10 comprising a tread strip 12.

The tread strip 12 comprises two circumferential grooves 14 positioned near the midplane of the tyre.

The tyre 10 depicted in FIG. 1 is in the new condition and the depth of the grooves 14 situated in the middle of the tread strip is 8 millimeters. The tyre 10 also comprises two circumferential grooves 15, located in the shoulders, that is to say near to the longitudinal edges of the contact patch of the tread strip 12.

As the tyre tread strip gradually becomes worn, the depth of the circumferential grooves decreases. FIG. 2 depicts the tyre of FIG. 1 in a condition in which the tread strip 12 is worn. It may be noted that the depth of the circumferential grooves 14 and 15 is smaller than that of the grooves in the new tyre. This depth in the worn condition is for example equal to 2.5 millimeters.

FIG. 3 schematically depicts the tyre 10 running along the ground 16 and viewed in radial section. In this diagram, the external surface of the tread strip 12 is represented as a continuous line 18 and the bottom of a groove 14 or 15 is represented as a dotted line 20. In the remainder of the description, reference will be made to the groove 14, but the same description could be given of the groove 15.

The contact patch via which the tyre 10 is in contact with the ground 16 is denoted by the reference 22. The length of this contact patch is denoted L.

Over the entire length of the contact patch, the groove 14 is covered by the ground 16. Thus, it is possible to define a cavity 24 in the shape of a pipe delimited by the portion of the groove 14 that is in the contact patch 22 and by the ground 16. This pipe is open at its two ends at the start and end of the contact patch. The cross sectional area of the pipe 24 is substantially equal to the cross sectional area of the groove 14.

Given that the depth of the groove 14 changes as the tyre becomes worn, the cross sectional area of the pipe 24 likewise changes and decreases as the tyre becomes worn.

The pipe 24 is schematically depicted in FIG. 4 in the form of a pipe of circular cross section and length L equal to the length of the contact patch via which the tyre is in contact with the ground. According to the conventional theory of resonance of organ pipes, the first fundamental mode of resonance of the pipe 24 depicted in FIG. 4 is such that its wavelength $\lambda$ is equal to twice the length L of this pipe. Thus, a curve representing half a wavelength has been depicted in dotted line inside the pipe 24 in FIG. 4.

Given that the frequency is equal to the speed at which sound travels through the air C divided by the wavelength $\lambda$, the resonant frequency of the pipe 24 is equal to C/2L. It may be noted that this frequency is not dependent on the rotational speed at which the tyre covers the ground nor is it dependent on the cross section of the pipe 24.

For example, in the case of a tyre of the passenger vehicle type, the contact patch may be of the order of 145 millimeters long in the middle, which means that the circumferential groove 14 has a resonant frequency substantially equal to 1170 Hertz. In the case of a heavy goods vehicle tyre, the length of the contact patch of which is 260 millimeters, the resonant frequency is 653 Hertz. These two resonant frequencies are readily detectable.

Thus, only the amplitude of resonance of this pipe 24 formed by the groove 14 as it contacts the ground 16 changes as a function of the cross section of the pipe, that is to say of the depth of the circumferential groove 14.

FIG. 5 represents three graphs, at three given speeds, of the noise, in terms of frequency, produced by the tyre in the new condition depicted in FIG. 1 and by the tyre in the worn condition depicted in FIG. 2. The frequency noise of the tyre in the new condition is represented in heavy line while the frequency noise of the tyre in the worn condition is represented in fine line.

The measurements were taken on a BMW 3.18d in an anechoic chamber. The tyres were Michelin Primacy HP size 205/55 R16. The runs were performed over a smooth surface coating at the nominal inflation pressure of 2.3 bar and under nominal load. The running noise was recorded by a microphone positioned in the wheel arch.

It may be seen from these graphs that, regardless of the speed at which the tyre is running along the ground, a noise frequency spike appears at around about the frequency of 1200 Hertz when the tyre is in the new condition and that this characteristic spike does not appear when the tyre is in the worn condition. The frequency of this spike is independent of the speed at which the tyre runs along the ground.

The frequency spike which appears in the case of a new tyre is the result of the resonance of the circumferential grooves of the tyre. When the tyre comprises several circumferential grooves, each goes into resonance and emits a resonance noise. It may be that the lengths of the pipes formed by the various grooves in contact with the ground are not all strictly identical, which means that the resonant frequencies of the various grooves will not all be the same. This is why in FIG. 5 the frequency spike which occurs at around about 1200 Hz is relatively wide rather than discrete.

The method of the invention thus proposes to use these properties of resonance of the circumferential grooves 14, 15 created at the surface of the tyre to trigger alerts if the tyre tread wear becomes too pronounced.

To do that, the first step is to measure the running noise of the tyre running along the ground.

In a next step, a noise emitted in a predetermined range of frequencies close to a predetermined resonant frequency of a portion of groove during running is isolated from the measured running noise. As identified previously, the predetermined resonant frequency of the portion of groove during running is determined as being substantially equal to C/2L. The noise emitted in a range close to this predetermined frequency is studied in order to take account of any spread on the resonant frequencies as a result of there being several grooves in the tyre tread strip.

Next, the amplitude of the noise isolated in this frequency range is measured and this measured amplitude is compared against a predetermined alert threshold.

In the example depicted in FIG. 5, the predetermined alert threshold can be defined as being equal to the value 10. It is seen that, when the amplitude of the noise is above this alert threshold, the tyre is still relatively new. By contrast, when the amplitude of the noise measured at the resonant frequency of the groove is below this alert threshold, the tyre is worn and a tyre wear alert needs to be triggered in order to inform the driver of the wear of his tyres.

It will be noted that this method of detecting tyre wear can be implemented on a tyre of any type provided that it comprises at least one circumferential groove 14 the resonant frequency of which can be determined in a simple way using the length of the contact patch.

FIG. 6 depicts another frequency analysis of the range of running noise which is centred around 1200 Hz recorded at a speed of 90 km/h. This analysis can be performed with better resolution than that of FIG. 5. It can be noted that the aforementioned spike in fact corresponds to two very closely spaced spikes. These two spikes are connected with the fact that the tyre tread pattern comprises, on the one hand, two circumferential grooves 14 positioned near the midplane of the tyre on each side thereof and, on the other hand, two circumferential grooves 15 located on the shoulders, that is to say at the edges of the contact patch. As FIG. 1 shows, the contact patch of such a tyre is ovalized and the length of the two central grooves 14 is greater than the length of the two lateral grooves 15. The central grooves 14 have a length of 145 mm, which corresponds to the spike in FIG. 6 that can be seen at around 1170 Hz; the lateral grooves 15 positioned on the shoulders have a length of 142 mm, which corresponds to the spike visible at around 1200 Hz. The variation in amplitude of these two spikes gives very sensitive indication of the tyre wear pattern, particularly in the event of abnormal wear. What is meant by abnormal wear is any uneven pattern of wear of the tyre tread block. Driving with camber, or lack of parallelism of the two wheels on the same axle, or even under-inflated tyres, may cause such abnormal wear patterns to arise.

When the relative difference in amplitude exceeds a predetermined alert threshold, an alert may be triggered to inform the driver that the tyre has abnormal, uneven wear.

FIGS. 7 and 8 depict a tyre 40 according to a second embodiment. This tyre 40 comprises a tread strip 42 in which, in the new condition, a circumferential channel 44 is embedded, as depicted in FIG. 7. One example of the design of such a tyre is described in document EP 1 616 719.

FIG. 7 shows that the channel 44 is visible in the radial section through the tread strip 42 of the tyre 40 but that this channel cannot be seen on the view of the tread strip from above. This is because this channel 44 does not open to the surface of the tread strip.

As the tread strip 42 of the tyre 40 gradually becomes worn, the layer of rubber separating the channel 44 from the exterior surface of the tread strip becomes thinner and thinner until it disappears. The disappearance of this layer of rubber causes the circumferential channel 44 to become uncovered and form a circumferential groove 46, as depicted in FIG. 8. Note that this circumferential groove 46 is now visible, even in the view of the tread strip 42 from above.

As already mentioned, the presence of this circumferential groove 46 causes a resonance noise when the groove is covered up again by the ground in the contact patch via which the tyre is in contact with the ground.

Thus, when the tyre is new, no groove resonance noise is heard, whereas, when the tyre becomes worn, the groove 46 appears and causes a resonance noise.

It is possible to implement an alternative form of the method of the invention in which the running noise emitted at a frequency near the resonant frequency of the groove 46 is measured. When the tyre is new, this resonance noise is absent and therefore below a predetermined threshold.

As soon as it is detected that this resonance noise is above the predetermined threshold, that means that the circumferential groove 46 has appeared as a result of tyre tread wear. An alert can therefore be triggered to warn the driver that his tyres are worn.

Thus, the method of the invention can be implemented either to detect the reduction in cross section of a circumferential groove already present on a new tyre or to detect the appearance of a circumferential groove that was initially embedded within the tread strip, these two phenomena being the result of tyre wear.

The invention claimed is:

1. A method for alerting to wear of a tyre that includes a tread strip equipped with at least one circumferential groove, the method comprising steps of:

measuring sound signals made by the tyre running along a ground;

from the measured running sound signals, isolating a sound signal emitted in a predetermined range of frequencies close to a predetermined resonant frequency of a portion of the circumferential groove during running;

measuring an amplitude of the isolated sound signal; and comparing the measured amplitude against a predetermined alert threshold wherein the tyre when in new condition includes a subsurface circumferential channel embedded in the tread strip, the subsurface circumferential channel forming the circumferential groove when the tyre becomes worn.

2. A method according to claim 1, wherein the predetermined resonant frequency corresponds to a frequency caused by a portion of the circumferential groove of a length substantially equal to a length of a contact patch via which the tyre is in contact with the ground, and wherein the portion of the circumferential groove via which the tyre is in contact with the ground is covered by the ground to form a pipe with the ground during running.

3. A method according to claim 2, wherein the predetermined frequency is substantially equal to $$\frac{C}{2 \cdot L},$$

where C is a speed at which sound travels through air and L is the length of the contact patch.

4. A method according to claim 1, wherein the predetermined alert threshold is dependent on a mean value of the running sound signals of the tyre running along the ground.

5. A method according to claim 1, wherein a tyre wear alert is triggered when a measured amplitude of resonance of the circumferential groove is above the predetermined alert threshold.

6. A method according to claim 1, wherein the circumferential channel has a cross-section area of at least 25 mm$^2$.

7. A method according to claim 1, wherein, in the step of measuring the amplitude of the isolated sound signal, at least two spikes of different frequencies corresponding to resonance sound signals of at least two circumferential grooves that are axially offset from a median plane of the tyre are isolated from the running sound signals in the predetermined range of frequencies, and wherein, in the step of comparing, relative amplitudes of the at least two spikes are compared.

8. A method according to claim 2, wherein the predetermined resonant frequency is independent of a rotational speed of the tyre during running.

* * * * *

UNITED STATES PATENT AND TRADEMARK OFFICE
CERTIFICATE OF CORRECTION

PATENT NO.         : 8,904,869 B2
APPLICATION NO.    : 13/140482
DATED              : December 9, 2014
INVENTOR(S)        : Antoine Paturle It is certified that error appears in the above-identified patent and that said Letters Patent is hereby corrected as shown below:

On the title page under "(73) ASSIGNEES:"

"COMPAGNIE GENERALE DES ESTABLISSEMENTS MICHELIN" should read
-- COMPAGNIE GENERALE DES ETABLISSEMENTS MICHELIN --.

Signed and Sealed this
Sixteenth Day of June, 2015

Michelle K. Lee
*Director of the United States Patent and Trademark Office*